United States Patent [19]

Ohshima et al.

[11] Patent Number: 4,656,113
[45] Date of Patent: Apr. 7, 1987

[54] DYE COMPOSITION AND USE THEREOF

[75] Inventors: Tetsuya Ohshima; Hisashi Senshu; Takeshi Matsuyama; Yoji Kawagishi; Takuo Andoh; Takashi Kiryu, all of Osaka, Japan

[73] Assignees: Nippon Gosei Kagako Kogyo KK; Orient Chemical Industries, Ltd., both of Japan

[21] Appl. No.: 777,671

[22] Filed: Sep. 19, 1985

Related U.S. Application Data

[62] Division of Ser. No. 654,204, Sep. 24, 1984, Pat. No. 4,568,624.

[30] Foreign Application Priority Data

Sep. 22, 1983 [JP] Japan ................ 58-175823

[51] Int. Cl.$^4$ .............................. G03G 9/08
[52] U.S. Cl. ...................... 430/137; 528/45
[58] Field of Search ............ 430/330, 311, 137; 525/344, 326.8; 528/45, 55

[56] References Cited

U.S. PATENT DOCUMENTS 4,353,978 10/1982 Leberzammer et al. .......... 430/311
4,460,427 7/1984 Haney et al. ..................... 430/330
4,477,548 10/1984 Harasta et al. .................... 430/126

*Primary Examiner*—John L. Goodrow
*Attorney, Agent, or Firm*—McGlew & Tuttle

[57] ABSTRACT

A dye composition prepared by polymerizing an unsaturated monomer in the presence of a quinoneimine dye and an azo initiator in amounts expressed by $x \geq 5$ and $y \geq 0.33 x^{1.2}$ wherein x is the amount of the quinoneimine dye in % by weight based on the unsaturated monomer, and y is the amount of the azo initiator in % by weight based on the unsaturated monomer. The composition is useful for preparing toners for developing electrostatic images because of its outstanding charge control effect and also for preparing electrostatic coating powder compositions.

7 Claims, No Drawings

DYE COMPOSITION AND USE THEREOF

This is a division of Application Ser. No. 654,204 filed Sept. 24, 1984, now U.S. Pat. No. 4,568,624.

The present invention relates to a dye composition useful for preparing toners for use in developing electrostatic images which are formed in the electrophotographic process, electrostatic printing process, electrostatic recording process, etc., the dye composition further being useful for preparing powder compositions for electrostatic coating.

Generally electrostatic images are developed into toner images with a toner which is a colored powder. The toner image is fixed as it is or as transferred onto copy paper or the like.

Usually toners are composed chiefly of a polymer serving as a binder, a coloring agent such as carbon black, and a specific dye serving as a charge control agent. The processes heretofore known for preparing such toners include (1) a process wherein these components are mixed together in specified proportions and melted by heating, and (2) a process wherein a binder and a toner are prepared at the same time by polymerizing a polymerizable unsaturated monomer in the presence of a coloring agent and a dye as a charge control agent.

Although the process (2) has the advantage of being a simplified toner production process, it is difficult to obtain a product of definite quality, while the product is prone to blocking, releases a noxious odor and has poor chargeability which is difficult to improve even with use of an increased amount of charge control agent. Thus the process is still infeasible. Accordingly the process (1) is usually practiced, but this process requires use of a considerably large amount of charge control agent to give satisfactory chargeability to the toner. The use of the control agent therefore involves not a few limitations in respect of handleability, environmental pollution and uniform dispersibility in the toner composition. For this reason, it is practically very significant to reduce the proportion of the control agent to the greatest possible extent, in other words, to improve the charge control effect of the agent. The process (1) has another drawback to overcome. The toner prepared by this process, when used for copying or printing over a prolonged period of time, is liable to permit fogging of copies or prints and to produce irregularities in density, failing to afford sharp images.

To solve these problems, we have conducted intensive research and consequently prepared a dye composition by polymerizing an unsaturated monomer in the presence of a quinoneimine dye and an azo initiator in amounts expressed by $x \geq 5$ and $y \geq 0.33 x^{1.2}$ wherein x is the amount of the quinoneimine dye in % by weight based on the unsaturated monomer, and y is the amount of the azo initiator in % by weight based on the unsaturated monomer. We have found that the dye composition has the following outstanding advantages. As compared with conventional dyes which are single compounds, the dye composition has improved compatibility with binders, is therefore easily dispersible and produces a remarkably enhanced charge control effect because the composition remains free of deterioration in this effect during the process by which it is formulated into a toner. Accordingly, when the dye composition is to be admixed with a coloring agent such as carbon black and a binder to obtain a toner for developing electrostatic images, the dye composition is usable in a reduced amount of up to about 50% (calculated as a single compound of dye) of the amount according to conventional formulations, and yet the resulting toner exhibits chargeability as high as is desired, giving sharp images even when used for a prolonged period of time for copying or printing. Thus, the present invention has been accomplished.

The quinoneimine dye to be used for the present invention can be any of those commercially available which are divided generally into azine dyes, oxazine dyes and thiazine dyes. Given below are examples of such dyes, which are in no way limitative.

Azine dyes

C.I. Solvent Black 5 (e.g. "Spirit Black SB", product of Orient Kagaku Kogyo K.K., "Calco Nigrosine SSB", product of A.C.C.)

C.I. Solvent Black 7 (e.g. "Nigrosine Base EX", "Oil Black BY", "Solbon Black BPL", "Oil Black BS", "Special Black EB", products of Orient Kagaku Kogyo K.K.)

C.I. Basic Black 2 (e.g. "Sumiacryl Black G", product of Sumitomo Chemical Co., Ltd.)

C.I. Basic Red 2 (e.g. "Safranine OK 70", product of Sumitomo Chemical Co., Ltd.)

Oxazine dye

C.I. Basic Blue 3 (e.g. "Astrazon Blue BG", product of Bayer A.G.

Thiazine dyes

C.I. Basic Blue 9 (e.g. "Methylene Blue FZ", product of Sumitomo Chemical Co., Ltd.)

C.I. Basic Blue 24 (e.g. "New Methylene Blue NS conc.", product of Sumitomo Chemical Co., Ltd.)

C.I. Basic Blue 25 (e.g. "Basic Blue Go", product of Sumitomo Chemical Co., Ltd.)

Examples of useful azo initiators are 2,2'-azobisisobutyronitrile, 2,2'-azobis-2,4-dimethylvaleronitrile, 2,2'-azobis-2-cyclopropylpropionitrile, 2,2'-azobis-2-methylbutyronitrile, 2,2'-azobis-2,3-dimethylbutyronitrile, 2,2'-azobis-2-methylvaleronitrile, 2-t-butylazo-2-cyano-4-methoxy-4-methylpentane, 2-t-butylazo-2-cyanopropane, 2-t-butylazo-2-cyano-4-methylpentane, 2-t-butylazo-2-cyanobutane, 1-t-butylazo-1-cyanocyclohexane, 2,2'-azobis-4-methoxy-2,4-dimethylvaleronitrile, 1,1'-azobiscyclohexane-1-carbonitrile, 4,4'-azobis-4-cyanovaleric acid, dimethyl-2-azobis-isobutyrate, etc.

When an unsaturated monomer is polymerized in the presence of the quinoneimine dye according to the invention, it is critical to use an azo initiator as selected from among other polymerization initiators. A composition having a remarkably improved charge control effect is obtained only when this type of initiator is used. It is difficult to obtain such an effect with other initiators such as benzoyl peroxide.

Further according to the present invention, the quinoneimine dye and the azo initiator must be used respectively in amounts x and y (in % by weight based on the unsaturated monomer) which are limited to the ranges defined by $x \geq 5$ and $y \geq 0.33 x^{1.2}$. The compositions having enhanced charge control effect can be prepared only under these conditions. Although there is no particular upper limit for the amounts x and y, it is usually practically favorable that the upper limit of x be 200 and that the upper limit of y be 190.4 in view of stability of polymerization, etc. The present invention is characterized by the use of such large amounts of quinoneimine dye and azo initiator. The polymerization for the purpose of giving an improved charge control effect is not known in any way, nor is it known to polymerize unsaturated monomers under these conditions.

Examples of unsaturated monomers which are usable in this invention are styrene monomers such as styrene, o-methylstyrene, m-methylstyrene, p-methylstyrene, α-methylstyrene, p-ethylstyrene, 2,4-dimethylstyrene, p-n-butylstyrene, p-tert-butylstyrene, p-n-hexylstyrene, p-n-docecylstyrene, p-methoxystyrene, p-phenylstyrene, p-chlorostyrene and 3,4-dichlorostyrene, unsaturated monoolefins such as ethylene, propylene, butylene and isobutylene, vinyl halides such as vinyl chloride, vinylidene chloride, vinyl bromide and vinyl fluoride, vinyl esters such as vinyl acetate, vinyl propionate, vinyl benzoate and vinyl butyrate, carboxylic acid esters such as methyl (meth)acrylate, ethyl (meth)acrylate, n-butyl (meth)acrylate, isobutyl (meth)acrylate, propyl (meth)acrylate, n-octyl (meth)acrylate, dodecyl (meth)acrylate, lauryl (meth)acrylate, 2-ethylhexyl (meth)acrylate, 2-chloroethyl (meth)acrylate, phenyl (meth)acrylate, methyl α-chloro(meth)acrylate, dimethylaminoethyl (meth)acrylate, diethylaminoethyl (meth)acrylate, maleic anhydride ester, maleic acid ester, fumaric acid ester, crotonic acid ester and itaconic acid ester, carboxylic acids such as (meth)acrylic acid, maleic anhydride, maleic acid, crotonic acid, itaconic acid and fumaric acid, (meth)acrylonitrile, (meth)acrylamide, alkyl vinyl ether, alkyl vinyl ketone, N-vinylpyrrole, N-vinylcarbazole, N-vinylindole, N-vinylpyrrolidone, etc. Such monomers are used singly or in admixture.

Desirable monomers are styrene, acrylates and methacrylates which are used singly or in admixture.

While a desired polymerization process is usable for practicing the present invention, solution polymerization, suspension polymerization or block polymerization is useful.

The solution for solution polymerization differs with the kind of unsaturated monomer used. Solvents which are usually used are alcohols such as methanol, ethanol, (iso)propanol, (iso)butanol and the like, toluene, methyl ethyl ketone, acetone, methyl isobutyl ketone, ethyl acetate, butyl acetate, etc.

For suspension polymerization, water is used as a medium. Useful suspension stabilizers include polyvinyl alcohols, celluloses, starch, gelatin, sodium polyacrylate and like known protective colloidal agents. Also useful are auxiliary dispersing agents such as barium sulfate, calcium sulfate, barium carbonate, calcium carbonate, clay and kieselguhr.

When the unsaturated monomer is to be polymerized in the presence of a quinoneimine dye and an azo initiator, these materials are fed to a reactor by a desired method, i.e. all at the same time, or in divided portions, insofar as the amounts x and y in the system are in the foregoing ranges. According to the invention, a considerably large amount of azo initiator is used, so that if the initiator is charged into the reactor at a time, the reaction is likely to proceed at an abnormally high velocity. To avoid such a hazard, the initiator may be added continuously dropwise or intermittently in divided portions of specified amount. When desired, about 10 to about 20% by weight of the whole amount of azo initiator to be used is used first for prepolymerization, and the remaining portion of the initiator is thereafter charged in for further polymerization.

The polymerization temperature, which slightly varies depending on the polymerization process, is usually about 50° to about 130° C. Desirable polymerization time is about 5 to about 25 hours.

After the reaction, the unreacted unsaturated monomer and the solvent are removed from the reaction mixture in a usual manner to obtain the desired composition in the form of particles, granules or blocks.

Toners are prepared with use of the composition by admixing the composition with suitable pigment, such as carbon black, dye and polymer serving as a binder. It is suitable to use the composition in an amount of 0.01 to 10% by weight, preferably 0.1 to 2% by weight, calculated as the quinoneimine dye to be contained in the toner. This amount is exceedingly smaller than the amount of charge control agent conventionally used for preparing toners. This means that the composition of the invention has a correspondingly increased charge control effect.

Examples of useful coloring agents are carbon black, rhodamine dyes, ferrocyanine pigments, Quinoline Yellow, etc.

Examples of suitable binders are homopolymers and copolymers of unsaturated monomers already exemplified. Auxiliary agents other than those mentioned above, such as charge control agents other than the composition of the invention, etc. can be suitably admixed with the toner components.

Although the composition of this invention has been described above mainly with reference to a case wherein it is used as a charge control agent, the composition is not limited to such use but is also useful for electrostatic coating powder compositions.

In electrostatic coating, the electrostatic characteristics of the coating composition influence the throwing power, deposition efficiency, equilibrium film thickness, etc. These characteristics, heretofore considered only in terms of the intrinsic electrical resistance value of the composition, need to be considered also from the viewpoint of the chargeability of the composition. According to the present invention, use of the dye composition affords coating compositions having outstanding coating properties.

The present invention will be described in greater detail with reference to the following examples, in which parts and percentages are all by weight.

PREPARATION OF DYE COMPOSITIONS

Dye composition I

Into a three-necked flask equipped with a reflux condenser were placed 140 parts of styrene, 60 parts of n-butyl methacrylate, 60 parts of hydroxyethyl methacrylate, 46 parts of Nigrosine Base EX and 300 parts of toluene. With addition of 60 parts of azobisisobutyronitrile, the monomers were polymerized at 75° to 90° C. for 10 hours. The toluene was removed from the resulting reaction mixture, giving a dye composition.

Dye composition II

Into a separable flask were placed 500 parts of water and 4 parts of polyvinyl alcohol. A solution of 20 parts of Nigrosine Base EX and 30 parts of 2,2'-azobis-2,4-dimethylvaleronitrile in 180 parts of a styrenehydroxypropyl methacrylate mixture (75/25) was then placed into the flask. The monomers were polymerized at 70° C. for 10 hours, giving a particulate dye composition.

Dye composition III

Into a three-necked flask equipped with a reflux condenser were placed 100 parts of styrene, 50 parts of n-butyl methacrylate, 50 parts of hydroxypropyl methacrylate and 67 parts of Nigrosine Base EX. With addition of 80 g of 1,1'-azobis(cyclohexanecarbonitrile), the monomers were polymerized at 80° to 120° C. for 10 hours to obtain a dye composition.

Dye composition IV

Styrene (200 parts), 50 parts of n-butyl methacrylate, 50 parts of Solbon Black BPL, 300 parts of toluene and 70 parts of azobisisobutyronitrile were mixed together. The monomers were polymerized at 75° to 90° C. for 10 hours. The toluene was removed from the resulting reaction mixture to obtain a dye composition.

Dye composition V

A dye composition was prepared in the same manner as the dye composition II except that Nigrosine Base EX was replaced by Oil Black BS.

Dye composition VI

Into a three-necked flask equipped with a reflux condenser were placed 20 parts of Methylene Blue FZ, 180 parts of vinyl acetate, 20 parts of monobutyl maleate and 200 parts of methanol. With addition of 24 parts of 2,2'-azobis-(2,4-dimethylvaleronitrile), the monomers were polymerized at 60° to 70° C. The methanol was removed from the reaction mixture, affording a dye composition.

Dye composition VII

A dye composition was prepared in the same manner as the dye composition VI except that Methylene Blue FZ was replaced by Safranine OK 70.

EXAMPLE 1

One hundred parts of styrene/n-butyl methacrylate copolymer (weight ratio 65/35, average molecular weight 40000, Tg 62° C.), 5 parts of carbon black and 5 parts of the dye composition I were pre-mixed together uniformly by a V-type blender for 1 hour. Subsequently the mixture was melted and kneaded by a kneader at 150° C. for 30 minutes. The kneaded mixture was cooled, roughly ground by a vibrating mill, further finely pulverized by an air mill and thereafter classified to obtain a powdery toner 15 microns in mean particle size. (The toner contained 1.53% of Nigrosine Base EX as a single dye compound.) Three parts of the toner and 97 parts of a particulate iron carrier (TEFV 200, product of Nippon Teppun Co., Ltd.) were mixed together to obtain a developer.

The amount of initial triboelectric charges on the toner was 15 μc/g. The toner was used for forming toner images by a copying machine having a zinc oxide drum and so modified that the toner collected from the drum by cleaning was recycled to a toner feeder. Initially sharp copy images were obtained without fogging or irregularities in density. The copy images obtained after making 30000 copies were also sharp free of any changes.

COMPARATIVE EXAMPLE 1

The procedure of Example 1 was repeated with the exception of using 1.53 parts of Nigrosine Base EX in place of the dye composition I used in Example 1. (The toner contained Nigrosine Base EX in the same proportion as in Example 1.)

The amount of initial triboelectric charges on the toner was as small as 1.5 μc/g. To obtain the same amount of charges as in Example 1, i.e. 15 μc/g, it was necessary to increase the proportion of Nigrosine Base EX in the toner to 5%.

COMPARATIVE EXAMPLE 2

Into a three-necked flask equipped with a reflux condenser were placed 100 parts of styrene, 1.53 parts of Nigrosine Base EX, 100 parts of toluene and 5 parts of carbon black. With addition of 2 parts of 2,2'-azobisisobutyronitrile, the monomer was polymerized at 80° to 95° C. for 10 hours. The unreacted styrene and toluene were removed from the reaction mixture in a usual manner, giving a powdery toner.

The amount of initial triboelectric charges on the toner was as small as 4 μc/g. The toner blocked markedly and released a noxious odor.

COMPARATIVE EXAMPLES 3-4

The procedure of Example 1 was repeated except that the dye composition I used in Example 1 was replaced by Nigrosine Base EX (Comparative Example 3) or by Oil Black BS (Comparative Example 4).

The amount of initial triboelectric charges on the toner was 16 μc/g in Comparative Example 3, or 18 μc/g in Comparative Example 4. In each of these comparative examples, the copy images initially obtained were sharp and free from fog or irregularities in density, whereas the copies obtained after continually making 10000 copies had fog and exhibited reduced resolution. The copying machine was further stained with scattering toner particles.

EXAMPLE 2

One hundred parts of styrene/n-butyl methacrylate/n-butyl acrylate copolymer (weight ratio 65/31/4, average molecular weight 40000, Tg 58° C.), 5 parts of carbon black and 5 parts of the dye composition II were uniformly premixed together by a V-type blender for 1 hour. The mixture was thereafter treated in the same manner as in Example 1. (The toner contained 0.5% of the single dye compound.)

The amount of initial triboelectric charges on the toner was 13 μc/g. The toner images formed had the same characteristics as those obtained in Example 1.

EXAMPLE 3

The procedure of Example 1 was repeated with the exception of using 100 parts of a styrene resin ("Piccolastic D-125", product of Esso Petrochemical Co.), 5 parts of carbon black and 5 parts of the dye composition III.

The amount of initial triboelectric charges was 16 μc/g. The copy images formed had the same characteristics as those Obtained in Example 1.

EXAMPLES 4-7

The procedure of Example 1 was repeated except that the dye composition I used in Example 1 was replaced by the dye composition IV (Example 4), the dye composition V (Example 5), the dye composition VI (Example 6) or the dye composition VII (Example 7).

The amount of initial triboelectric charges was 20 μc/g in Example 4, 18 μc/g in Example 5, 16 μc/g in Example 6, or 14 μc/g in Example 7. The copy images formed in each of these examples had the same characteristics as those obtained in Example 1.

EXAMPLE 8

One hundred parts of polyester resin for powder coating compositions and 2 parts of the dye composition I were kneaded, pulverized and classified in usual manner to prepare a powder coating composition, 30 to 50 microns in particle size. The amount of charges on the coating composition was −6.5 μc/g.

The composition was applied to steel panels, 0.8×70×150 mm, by the conventional electrostatic coating process and baked at 160° C. for 20 seconds.

The coating had a good appearance, a thickness of 60 to 65 microns, a cross-cut adhering property of 100/100, pencile hardness of H and a boiling-water (two-hour) adhering property of 90/100.

COMPARATIVE EXAMPLE 5

The procedure of Example 8 was repeated with the exception of using Nigrosine Base EX in place of the dye composition I.

The amount of charges on the coating composition was −11.3 μc/g. The coating formed from the composition was noticeably poor in surface smoothness and had a cross-cut adhering property of 99/100, pencile hardness of H and a boiling-water (two-hour) adhering property of 40/100.

What is claimed is:

1. A dye composition prepared by polymerizing an unsaturated monomer in the presence of a quinoneimine dye and an azo initiator in amounts expressed by $x \geq 5$ and $y \geq 0.33x^{1.2}$ wherein x is the amount of the quinoneimine dye in % by weight based on the unsaturated monomer, and y is the amount of the azo initiator in % by weight based on the unsaturated monomer.

2. An electrostatic coating powder composition which comprises a dye composition prepared by polymerizing an unsaturated monomer in the presence of a quinoneimine dye and an azo initiator in amounts expressed by $x \geq 5$ and $y \geq 0.33x^{1.2}$ wherein x is the amount of the quinoneimine dye in % by weight based on the unsaturated monomer, and y is the amount of the azo initiator in % by weight based on the unsaturated monomer.

3. An electrostatic coating powder composition which comprises a dye composition prepared by polymerizing an unsaturated monomer in the presence of a quinoneimine dye and an azo initiator in amounts expressed by $x \geq 5$ and $y \geq 0.33x^{1.2}$ wherein x is the amount of the quinoneimine dye in % by weight based on the unsaturated monomer, and y is the amount of the azo initiator in % by weight based on the unsaturated monomer, said dye composition being combined with a coating resin to provide an electrostatic coating powder for electrostatic coating of surfaces.

4. Coating composition of claim 3, wherein the resin is a meltable resin capable of forming an adherent coating upon baking a surface electrostatically coated with the electrostatic coating powder.

5. Composition of claim 1 wherein x is 5 to 200% and y is 2.28 to 190.4%.

6. Composition of claim 2 wherein x is 5 to 200% and y is 2.28 to 190.4%.

7. Composition of claim 3 wherein x is 5 to 200% and y is 2.28 to 190.4%.

* * * * *